(12) United States Patent
Fukaya et al.

(10) Patent No.: US 8,757,785 B2
(45) Date of Patent: *Jun. 24, 2014

(54) TREATMENT SOLUTION FOR INK-JET RECORDING, INK SET, INK-JET RECORDING METHOD, AND INK-JET RECORDING APPARATUS

(75) Inventors: Hideji Fukaya, Nisshin (JP); Taro Nagano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 155 days.

This patent is subject to a terminal disclaimer.

(21) Appl. No.: 13/427,947

(22) Filed: Mar. 23, 2012

(65) Prior Publication Data

US 2012/0268520 A1  Oct. 25, 2012

(30) Foreign Application Priority Data

Apr. 22, 2011 (JP) ................................. 2011-096420

(51) Int. Cl.
- *B41J 2/01* (2006.01)
- *B41J 2/21* (2006.01)
- *B41J 11/00* (2006.01)
- *C09D 11/00* (2014.01)

(52) U.S. Cl.
CPC ............ *B41J 2/2114* (2013.01); *B41J 2/2107* (2013.01); *B41J 11/0015* (2013.01); *C09D 11/54* (2013.01)
USPC .................. 347/96; 347/95; 347/100; 347/98

(58) Field of Classification Search
CPC ............ B41J 2/01; B41J 2/21; B41J 2/2107; B41J 2/2114; B41J 11/0015; C09D 11/30; C09D 11/322; C09D 11/54
USPC ............... 347/21, 28, 95–100; 523/160, 161; 106/31.13, 31.6, 31.49, 31.78
See application file for complete search history.

(56) References Cited

U.S. PATENT DOCUMENTS

| | | | | |
|---|---|---|---|---|
| 4,664,670 A | * | 5/1987 | Mehl et al. | 8/470 |
| 4,767,420 A | * | 8/1988 | Mehl et al. | 8/470 |
| 5,213,613 A | * | 5/1993 | Nagashima et al. | 106/31.43 |
| 5,609,671 A | | 3/1997 | Nagasawa | |
| 5,837,045 A | | 11/1998 | Johnson et al. | |
| 6,090,193 A | * | 7/2000 | Nigam et al. | 106/31.27 |
| 7,485,179 B2 | * | 2/2009 | Roh et al. | 106/31.46 |
| 7,887,177 B2 | * | 2/2011 | Doi et al. | 347/103 |
| 2002/0044185 A1 | | 4/2002 | Koitabashi et al. | |
| 2002/0044187 A1 | | 4/2002 | Koitabashi et al. | |
| 2006/0201380 A1 | | 9/2006 | Kowalski et al. | |
| 2007/0002111 A1 | * | 1/2007 | Roh et al. | 347/100 |
| 2007/0100023 A1 | | 5/2007 | Burns et al. | |
| 2007/0100024 A1 | | 5/2007 | Gu et al. | |
| 2010/0295891 A1 | * | 11/2010 | Goto et al. | 347/21 |

FOREIGN PATENT DOCUMENTS

| | | |
|---|---|---|
| JP | 07-331146 | 12/1995 |
| JP | 08-003498 | 1/1996 |
| JP | 11-314449 | 11/1999 |

(Continued)

*Primary Examiner* — Matthew Luu
*Assistant Examiner* — Rut Patel
(74) *Attorney, Agent, or Firm* — Banner & Witcoff, Ltd.

(57) ABSTRACT

A treatment solution for ink-jet recording includes a solvent which contains at least one of water and a water-soluble organic solvent; and an N-hydroxy cyclic imide compound which is soluble in the solvent.

9 Claims, 1 Drawing Sheet

(56) References Cited

FOREIGN PATENT DOCUMENTS

| | | |
|---|---|---|
| JP | 2000-513396 | 10/2000 |
| JP | 2002-079740 | 3/2002 |
| JP | 2002-086707 | 3/2002 |
| JP | 2008-524400 | 7/2008 |
| JP | 2009-515007 | 4/2009 |

* cited by examiner

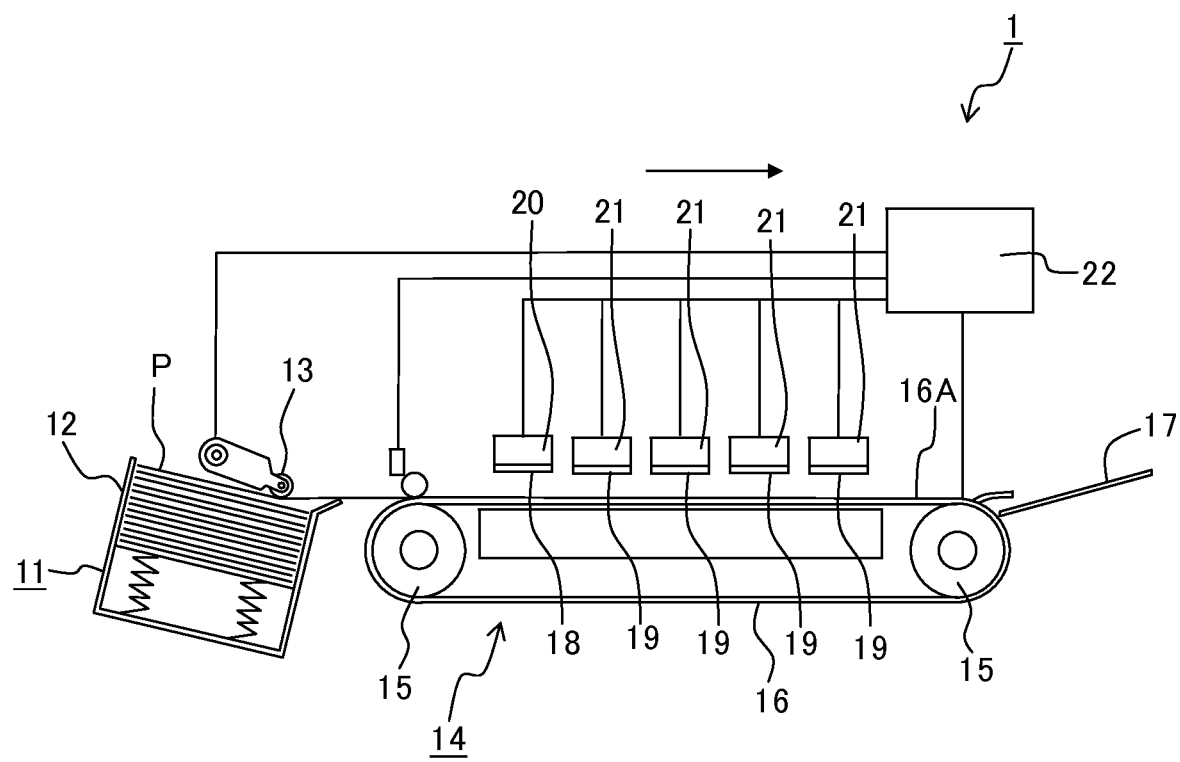

TREATMENT SOLUTION FOR INK-JET RECORDING, INK SET, INK-JET RECORDING METHOD, AND INK-JET RECORDING APPARATUS

CROSS REFERENCE TO RELATED APPLICATION

The present application claims priority from Japanese Patent Application No. 2011-096420 filed on Apr. 22, 2011 the disclosure of which is incorporated herein by reference in its entirety.

BACKGROUND OF THE INVENTION

1. Field of the Invention

The present invention relates to a treatment solution for ink-jet recording, an ink set, an ink-jet recording method, and an ink-jet recording apparatus.

2. Description of the Related Art

In the ink-jet recording method, the recording is performed by discharging an ink in a liquid droplet form from a large number of nozzles provided for an ink-jet head. For example, a high quality image can be recorded on a variety of recording media thereby, and hence the ink-jet recording method is widely utilized. A recording method of the two-part reaction type is known as one of the ink-jet recording methods as described above, wherein two liquids, i.e., an ink and a treatment solution for aggregating the ink are reacted to aggregate the ink, and thus the fixation of the ink is facilitated. Up to the present, treatment solutions have been suggested, which are blended with a cationic polymer and/or a polyvalent metal ion having the action to aggregate the pigment.

SUMMARY OF THE INVENTION

In recent years, for example, the technique for forming an image from digital data has come into widespread use, in accordance with which it is more demanded to improve the quality of an image subjected to the recording by the ink-jet recording system. It is expected to develop a novel treatment solution which has been conventionally unknown and develop an ink-jet recording technique based on the use of the same. This specification discloses a technique for improving the image quality in the ink-jet recording of the two-part reaction type.

According to a first aspect of the present teaching, there is provided a treatment solution for ink-jet recording, including a solvent which contains at least one of water and a water-soluble organic solvent; and an N-hydroxy cyclic imide compound which is soluble in the solvent.

According to a second aspect of the present teaching, there is provided an ink set including the treatment solution for ink-jet recording as defined in the first aspect; and an ink which contains water, a water-soluble organic solvent, and a self-dispersible pigment.

According to a third aspect of the present teaching, there is provided an ink-jet recording method for performing recording on a recording medium, including applying the treatment solution of the ink set as defined in the second aspect to the recording medium; and discharging the ink of the ink set to the recording medium.

According to a fourth aspect of the present teaching, there is provided an ink-jet recording apparatus for performing recording on a recording medium, including an ink set accommodating unit which accommodates the ink set as defined in the second aspect; a treatment solution applying mechanism which applies, to the recording medium, the treatment solution of the ink set accommodated in the ink set accommodating unit; and an ink discharge mechanism which discharges the ink of the ink set to the recording medium.

BRIEF DESCRIPTION OF THE DRAWINGS

FIG. 1 shows a schematic side view illustrating an internal structure of an ink-jet recording apparatus according to an embodiment.

DESCRIPTION OF THE PREFERRED EMBODIMENTS

An explanation will be made in detail below about the treatment solution for ink-jet recording of the present teaching, and the ink set, the ink-jet recording method, and the ink-jet recording apparatus which are based on the use of the same.

[Treatment Solution for Ink-jet Recording]

The treatment solution for ink-jet recording of the present teaching is to be applied to a recording area for a water-based pigment ink on a recording medium in the ink-jet recording. The treatment solution for ink jet recording of the present teaching includes a solvent which contains at least one of water and a water-soluble organic solvent and an N-hydroxy cyclic imide compound which is soluble in the solvent.

It is appropriate that the N-hydroxy cyclic imide compound, which is used for the treatment solution for ink jet recording, is dissolvable in at least one of water and the water-soluble organic solvent. Examples of the N-hydroxy cyclic imide compound as described above can be exemplified, for example, by N-hydroxysuccinimide and N-hydroxyphthalimide.

The content of the N-hydroxy cyclic imide compound is preferably not less than 0.1% by mass and more preferably not less than 0.1% by mass and not more than 5.0% by mass with respect to the total amount of the treatment solution. When the content of the N-hydroxy cyclic imide compound is within the range as described above, it is possible to sufficiently improve the optical density of the image in the ink-jet recording.

The solvent, which is usable for the treatment solution for ink-jet recording, is required to have the affinity for the solvent used for the water-based pigment ink. Therefore, it is possible to use at least one of water and the water-soluble organic solvent. Water or the water-soluble organic solvent can be used singly or in a mixed manner. It is also allowable to mix water and two or more of the water-soluble organic solvents. Examples of the water-soluble organic solvent can be exemplified by alcohols such as ethanol or the like and ethers.

It is preferable that water to be used for the treatment solution for ink-jet recording is ion exchange water or pure water. The blending amount of water with respect to the total amount of the treatment solution for ink-jet recording may be, for example, the balance of the other components.

The treatment solution may contain any colorant, or the treatment solution may contain no colorant. When the treatment solution contains a colorant, it is preferable that the colorant is in an amount of such an extent that no influence is exerted on the recorded image.

The treatment solution for ink-jet recording of the present teaching makes it possible to improve the image quality in the ink-jet recording.

[Ink Set]

The treatment solution for ink-jet recording described above is used as an ink set by combining the treatment solution for ink-jet recording with an ink (ink composition) containing a self-dispersible pigment. The ink contains water, a water-soluble organic solvent, and the self-dispersible pigment. It is preferable that water, which is used for the ink for ink-jet recording, is ion exchange water or pure water. The blending amount of water (water ratio) with respect to the total amount of the ink may be the balance of the other components.

The self-dispersible pigment is dispersible in water without using any dispersant, for example, owing to the fact that at least one of the hydrophilic functional group and the salt thereof including, for example, carbonyl group, hydroxyl group, sulfo group, and phosphate group is introduced into the pigment particles by the chemical bond directly or with any other group intervening therebetween.

Those usable as the self-dispersible pigment include, for example, those in which the pigment is treated or processed in accordance with any method described, for example, in Japanese Patent Application Laid-open No. 8-3498, Japanese Patent Application Laid-open No. 2000-513396 (PCT), Japanese Patent Application Laid-open No. 2008-524400 (PCT), and Japanese Patent Application Laid-open No. 2009-515007 (PCT). As for the pigment as the raw material for the self-dispersible pigment, it is possible to use any one of inorganic pigments and organic pigments. Specified examples of the pigment, which are suitable to perform the treatment as described above, include, for example, carbon blacks such as "MA8" and "MA100" produced by Mitsubishi Chemical Corporation and "Color Black FW200" produced by Degussa. Further, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd. In particular, it is appropriate that the self-dispersible pigment is dispersible in the solvent in the absence of any surfactant by introducing at least one of the hydrophilic functional group and the salt thereof including, for example, phosphate group ($-PO_3H_2$), carboxyl group ($-COOH$), and sulfo group ($-SO_3H$) into the surfaces of the pigment particles by the chemical bond.

The blending amount of the solid content of the self-dispersible pigment with respect to the total amount of the ink (pigment solid content amount) is not specifically limited, which can be appropriately determined depending on, for example, the desired optical density and the coloration or colorfulness. The pigment solid content amount is, for example, 0.1% by mass to 20% by mass, preferably 1% by mass to 10% by mass, and more preferably 2% by mass to 8% by mass.

The mechanism of the effect to improve the image quality, which is brought about by the combination of the ink and the treatment solution for ink jet recording as described above, is not necessarily clarified. However, the mechanism is considered as follows.

When the self-dispersible pigment, which is dispersed in water in the ink, is brought in contact with the N-hydroxy cyclic imide compound on the recording medium, the modification group of the self-dispersible pigment and the hydroxy group of the N-hydroxy cyclic imide compound perform the condensation reaction as shown in the following reaction formula (1) (provided that the following reaction formula (1) is illustrative of an exemplary case in which the modification group of the self-dispersible pigment is the carboxyl group and the N-hydroxy cyclic imide compound is N-hydroxysuccinimide, and only the carboxyl group is shown for the self-dispersible pigment while omitting the pigment particle). Accordingly, the modification group of the self-dispersible pigment is inactivated, and the dispersibility is lowered. Aggregation of the pigment particles is facilitated, and the optical density value (OD value) is improved.

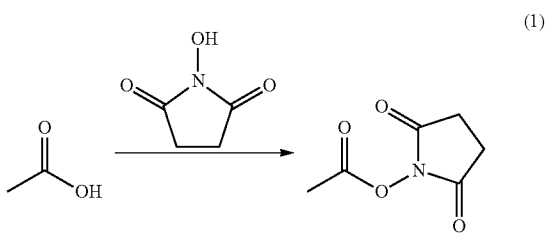

(1)

According to the mechanism as described above, it is considered that the function and the effect of the present teaching can be achieved by any combination provided that the combination is the combination of the ink containing the self-dispersible pigment and the treatment solution for ink-jet recording containing the N-hydroxy cyclic imide compound which has the hydroxy group capable of performing the condensation reaction with the modification group of the self-dispersible pigment and which is dissolvable in water or the water-soluble organic solvent used as the solvent.

The formula (1) described above is illustrative of the exemplary case in which the functional group (modification group), which modifies the surface of the self-dispersible pigment, is the carboxy group, and the N-hydroxy cyclic imide compound is N-hydroxysuccinimide by way of example. However, it is considered that the same or equivalent relationship also holds, for example, in the case of the self-dispersible pigment having, for example, the phosphate group, the sulfa group, or the salt thereof and the N-hydroxy cyclic imide compound having the reactivity with the modification group (for example, N-hydroxyphthalimide).

In particular, it is possible to consider that the larger effect to improve the image quality is obtained by using the ink containing the self-dispersible pigment having the modification group with which the condensation reaction proceeds more easily with respect to the hydroxy group of the N-hydroxy cyclic imide compound. Specifically, it is possible to preferably use the ink containing the self-dispersible pigment having the phosphate group or the carboxyl group introduced into the surfaces of the pigment particles.

It is also allowable that the water-soluble organic solvent is mixed, for example, as the penetrant and/or the humectant in the ink, if necessary. As for the water-soluble organic solvent, it is possible to use those generally used for the ink for ink-jet recording. When the water-soluble organic solvent or organic solvents is/are mixed with both of the treatment solution for ink-jet recording and the ink, it is also allowable that the water-soluble organic solvent mixed in the treatment solution for ink-jet recording and the water-soluble organic solvent mixed in the ink are of an identical type or of different types.

Other than the above, it is also allowable that the ink contains any additive generally contained in the ink of this type.

[Ink-Jet Recording Method]

The ink-jet recording method of the present teaching uses the treatment solution for ink-jet recording and the ink described above, and the ink jet recording method includes a treatment solution-applying step of applying the treatment solution for ink jet recording to a recording medium, and an ink-discharging step of discharging the ink to the recording medium by an ink jet method.

In the treatment solution-applying step, any method may be used as the method for applying the treatment solution for ink-jet recording to the recording medium. Examples of the method as described above can be exemplified, for example, by a method in which the treatment solution for ink-jet recording is discharged by the ink jet method and a method in which a part of the recording medium or the entire recording medium is coated with the treatment solution for ink jet recording by, for example, a stamp, a roller, or a brush.

The ink can be discharged to the recording medium in the ink-discharging step by any known ink-jet method.

The treatment solution of the present teaching is preferably used as a pretreatment solution to be applied to the recording medium prior to the discharge of the ink. Accordingly, for example, it is possible to enhance the aggregation efficiency of the self-dispersible pigment contained in the ink. However, the present teaching is not limited to. In the present teaching, the treatment solution may be applied after discharging the ink to the recording medium beforehand, or the application of the treatment solution to the recording medium and the discharge of the water-based ink may be performed simultaneously.

The treatment solution may be applied to the entire surface of the recording surface of the recording medium, or the treatment solution may be applied to a part thereof. When the treatment solution is applied to the part, at least the recording area subjected to the recording with the ink on the recording surface of the recording medium is the application portion of the treatment solution. It is preferable that the size of the application portion of the treatment solution is larger than the recording area subjected to the recording with the ink.

[Ink-Jet Recording Apparatus]

The ink-jet recording apparatus of the present teaching is an apparatus for performing the printing of, for example, an image on the recording medium by the ink-jet recording method described above. FIG. 1 shows an exemplary arrangement of the ink-jet recording apparatus. The ink-jet recording apparatus 1 carries a line type ink-jet head. The treatment solution for ink-jet recording and the ink are discharged to the recording surface of the recording paper P in accordance with the ink-jet system in the apparatus.

The ink-jet recording apparatus 1 has a paper feed unit 11, a belt transport mechanism 14, and a paper discharge unit 17 which are juxtaposed in this order. The ink-jet recording apparatus 1 is formed with a recording paper transport passage in which the recording paper P is transported from the paper feed unit 11 via the belt transport mechanism 14 toward the paper discharge unit 17. The paper feed unit 11 is provided with a recording paper stocker 12 in which the recording paper P is stocked, and a pickup roller 13 which picks up the recording paper one by one from the recording paper stocker 12 to feed the recording paper to the belt transport mechanism 14.

The belt transport mechanism 14 includes two belt rollers 15, 15 and a transport belt 16 which is applied to span the two belt rollers 15, 15. In this arrangement, the belt roller 15, which is disposed on the downstream side, is driven and rotated by the motive power of an unillustrated motor, and thus the transport belt 16 is moved in a circulating manner.

One head 18 for the treatment solution (treatment solution head) (corresponding to the treatment solution applying mechanism of the present teaching) and four ink-jet heads 19 (corresponding to the ink discharge mechanism of the present teaching) are arranged over or above the upper surface (transport surface 16A) of the transport belt 16. The treatment solution head 18 and the ink-jet heads 19 are aligned in one array in the transport direction of the recording paper P (direction of the arrow shown in the drawing) at the positions over or above the transport belt 16. The treatment solution head 18 is arranged on the most upstream side in the transport direction, and the four ink-jet heads 19 are successively arranged on the downstream side thereof. The treatment solution head 18 and the ink-jet heads 19 discharge the treatment solution for ink-jet recording and the inks onto the recording paper P in accordance with the ink-jet system.

A treatment solution cartridge 20 (corresponding to the treatment solution accommodating unit of the present teaching) and ink cartridges 21 (corresponding to the ink accommodating unit of the present teaching) are arranged at upper portions of the treatment solution head 18 and the ink-jet heads 19 respectively. The treatment solution for ink-jet recording is accommodated in the treatment solution cartridge 20. The treatment solution for ink-jet recording is supplied from the treatment solution cartridge 20 to the treatment solution head 18. On the other hand, the inks are accommodated in the four ink cartridges 21 respectively. The inks are supplied from the ink cartridges 21 to the ink-jet heads 19.

The treatment solution for ink-jet recording, which is accommodated in the treatment solution cartridge 20, contains the N-hydroxy cyclic imide compound and water or the water-soluble organic solvent. On the other hand, the inks, which are accommodated in the four ink cartridges 21 respectively, are the four color inks of yellow, magenta, cyan, and black. Each of the inks contains water, the water-soluble organic solvent, and the self-dispersible pigment.

The paper feed unit 11, the belt transport mechanism 14, the paper discharge unit 17, the treatment solution head 18, and the ink jet heads 19 are controlled by a control unit 22.

Next, an explanation will be made about the procedure for performing the ink-jet recording by the ink-jet recording apparatus 1 constructed as described above.

When the recording is started, then the recording paper P is picked up from the paper feed unit 11, the recording paper P is fed to the transport belt 16, and the recording paper P flows on the transport surface 16A. When the recording area of the recording paper P passes under the treatment solution head 18, then the liquid droplets of the treatment solution for ink-jet recording are firstly discharged toward the surface of the recording paper P, and thus the liquid droplets are applied to the surface of the recording paper P. Subsequently, the recording paper P is further transported. When the portion of the recording paper P, to which the liquid droplets of the treatment solution for ink-jet recording have been applied, passes under the four ink jet heads 19, then the liquid droplets of the inks are discharged from the respective ink-jet heads 19, and the liquid droplets of the inks are applied in a superimposed manner to the portion to which the liquid droplets of treatment solution for ink-jet recording have been applied. Accordingly, the N-hydroxy cyclic imide compound contained in the treatment solution for ink-jet recording and the modification group of the self-dispersible pigment contained in the ink are reacted with each other on the recording paper P, and the aggregation of the pigment particles is facilitated. Accordingly, an image having a high optical density value (OD value) is obtained.

The ink-jet recording apparatus 1 described above is provided with the treatment solution discharge mechanism (treatment solution head 18) for discharging the treatment solution for ink-jet recording to the surface of the recording paper P, as the treatment solution applying mechanism. However, it is also allowable that the treatment solution applying mechanism is any treatment solution coating mechanism for coating the surface of the recording paper P with the treatment solution, including, for example, a stamp, a brush, and a roller.

The line type ink-jet head is adopted for the ink jet recording apparatus 1 described above. However, it is also allowable to adopt any serial type ink-jet head.

EXAMPLES

The present teaching will be explained in further detail below as exemplified by Examples.

1. Test Method (1) Preparation of Treatment Solution

Respective components were mixed uniformly or homogeneously in compositions shown in Table 1 to obtain twelve types of treatment solutions 1 to 12.

TABLE 2

|  | Ink A | Ink B | Ink C | Ink D |
|---|---|---|---|---|
| Water dispersion of phosphate group modified self-dispersible pigment (Black) (% by mass) *2 | 26.7 (4.0) | — | — | — |
| CAB-O-JET 300 (Black) (% by mass) *3 | — | 26.7 (4.0) | — | — |
| CAB-O-JET 200 (Black) (% by mass) *4 | — | — | 20.0 (4.0) | — |
| Water dispersion of phosphate group modified self-dispersible pigment (Magenta) (% by mass) *5 | — | — | — | 26.7 (4.0) |
| Glycerol (% by mass) | 23.0 | 23.0 | 23.0 | 23.0 |
| Triethylene glycol monobutyl ether (% by mass) | 2.0 | 2.0 | 2.0 | 2.0 |
| 2,4,7,9-Tetramethyl-5-decyne-4,7-diol-di(polyoxymethylethylene)$_{m+n}$ ether (% by mass) *1 | 0.2 | 0.2 | 0.2 | 0.2 |
| Water | balance | balance | balance | balance |

*1: produced by Nissin Chemical Industry Co., Ltd., m + n = ave. 10 mol.;
*2: adjusted to provide pigment concentration = 15% by method described in WO2007/053564, parenthesized numeral indicates pigment solid content;
*3: produced by Cabot Specialty Chemicals, pigment concentration = 15%, parenthesized numeral indicates pigment solid content;
*4: produced by Cabot Specialty Chemicals, pigment concentration = 20%, parenthesized numeral indicates pigment solid content;
*5: adjusted to provide pigment concentration = 15% by method described in WO2007/053564, parenthesized numeral indicates pigment solid content.

TABLE 1

|  | Treatment solution 1 | Treatment solution 2 | Treatment solution 3 | Treatment solution 4 | Treatment solution 5 | Treatment solution 6 |
|---|---|---|---|---|---|---|
| N-hydroxysuccinimide (% by mass) *1 | 5.0 | 1.0 | 1.0 | 0.5 | 0.1 | — |
| N-hydroxyphthalimide (% by mass) *1 | — | — | — | — | — | 1.0 |
| Succinimide (% by mass) *1 | — | — | — | — | — | — |
| Phthalimide (% by mass) *1 | — | — | — | — | — | — |
| Triethylene glycol monobutyl ether (% by mass) | — | — | 2.0 | — | — | — |
| 2,4,7,9-Tetramethyl-5-decyne-4,7-diol-di(polyoxymethylethylene)$_{m+n}$ ether (% by mass) *2 | — | — | 0.2 | — | — | — |
| Water (% by mass) | balance | balance | balance | balance | balance | — |
| Ethanol (% by mass) | — | — | — | — | — | balance |

|  | Treatment solution 7 | Treatment solution 8 | Treatment solution 9 | Treatment solution 10 | Treatment solution 11 | Treatment solution 12 |
|---|---|---|---|---|---|---|
| N-hydroxysuccinimide (% by mass) *1 | — | — | — | — | — | — |
| N-hydroxyphthalimide (% by mass) *1 | — | — | — | — | — | — |
| Succinimide (% by mass) *1 | 5.0 | 1.0 | — | — | — | — |
| Phthalimide (% by mass) *1 | — | — | 5.0 | 1.0 | — | — |
| Triethylene glycol monobutyl ether (% by mass) | — | — | — | — | — | — |
| 2,4,7,9-Tetramethyl-5-decyne-4,7-diol-di(polyoxymethylethylene)$_{m+n}$ ether (% by mass) *2 | — | — | — | — | — | — |
| Water (% by mass) | balance | balance | — | — | 100 | — |
| Ethanol (% by mass) | — | — | balance | balance | — | 100 |

*1 produced by Kanto Kagaku;
*2 produced by Nissin Chemical Industry Co., Ltd., m + n = ave. 10 mol.

(2) Preparation of Ink

The respective components were mixed in accordance with the following procedure by using compositions shown in Table 2 to obtain four types of pigment inks A to D for ink-jet recording. An ink solvent was obtained by uniformly mixing the components except for the self-dispersible pigment of the respective components shown in Table 2. The self-dispersible pigment was gradually added to the ink solvent, followed by being mixed uniformly to obtain a mixture. The obtained mixture was filtrated through a cellulose acetate type membrane filter (pore size: 3.00 μm) produced by Toyo Roshi Kaisha, Ltd. Thus, pigment inks for ink-jet recording were obtained. The black self-dispersible pigments were used for Inks A, B, and C, and the magenta self-dispersible pigment was used for Ink D.

(3) Coating of Recording Paper with Treatment Solution and Printing

Xerox 4200 (A6 size) was used as the printing paper. A cardboard (thick paper) was placed on a glass plate having an outer shape which was one size larger than the printing paper, and the printing paper was placed on the cardboard. The surface of the printing paper was uniformly coated with each of the treatment solutions prepared in 1) described above by using a bar coater (produced by Yasuda Seiki Seisakusho LTD., rod No. 5). After the coating, the printing paper was fixed to another printing paper having A4 size by a tape.

The printing paper was set to a digital multifunction machine DCP-386C carried with an ink-jet printer produced by Brother Industries, Ltd. An image, which included a single color patch, was printed at a resolution of 600 dpi×600 dpi by using the pigment ink prepared in 2) described above to prepare an evaluation sample.

(4) Evaluation of Optical Density Value (OD Value)

The optical density value (OD value) of the evaluation sample prepared in 3) described above was measured by using a spectrophotometer Spectrolino produced by Gretag Macbeth (light source: D50, field: 2°, STATUS T). The OD value was measured five times for each of the evaluation samples, and the average value was adopted as the OD value.

2. Test Result

Table 3 shows the combinations of the treatment solutions and the inks and the measurement results of the optical density value in Examples, Comparative Examples, and Control Examples respectively.

TABLE 3

| | | Treatment solution | | |
|---|---|---|---|---|
| | | Cyclic imide compound | | Solvent |
| Example 1 | Treatment solution 1 | N-hydroxysuccinimide | 5% | water |
| Example 2 | Treatment solution 2 | N-hydroxysuccinimide | 1% | water |
| Example 3 | Treatment solution 2 | N-hydroxysuccinimide | 1% | water |
| Example 4 | Treatment solution 2 | N-hydroxysuccinimide | 1% | water |
| Example 5 | Treatment solution 2 | N-hydroxysuccinimide | 1% | water |
| Example 6 | Treatment solution 3 | N-hydroxysuccinimide | 1% | water |
| Example 7 | Treatment solution 3 | N-hydroxysuccinimide | 1% | water |
| Example 8 | Treatment solution 4 | N-hydroxysuccinimide | 0.5% | water |
| Example 9 | Treatment solution 5 | N-hydroxysuccinimide | 0.1% | water |
| Example 10 | Treatment solution 6 | N-hydroxyphthalimide | 1% | ethanol |
| Example 11 | Treatment solution 6 | N-hydroxyphthalimide | 1% | ethanol |
| Comp. Ex. 1 | Treatment solution 7 | succinimide | 5% | water |
| Comp. Ex. 2 | Treatment solution 8 | succinimide | 1% | water |
| Comp. Ex. 3 | Treatment solution 9 | phthalimide | 5% | ethanol |
| Comp. Ex. 4 | Treatment solution 10 | phthalimide | 1% | ethanol |
| Cont. Ex. 1 | Treatment solution 11 | — | — | water |
| Cont. Ex. 2 | Treatment solution 11 | — | — | water |
| Cont. Ex. 3 | Treatment solution 11 | — | — | water |
| Cont. Ex. 4 | Treatment solution 11 | — | — | water |
| Cont. Ex. 5 | Treatment solution 12 | — | — | ethanol |
| Cont. Ex. 6 | Treatment solution 12 | — | — | ethanol |

| | Ink | | OD value | ΔOD | Judgment |
|---|---|---|---|---|---|
| Example 1 | Ink A | phosphate group | 1.53 | 0.18 | Good |
| Example 2 | Ink A | phosphate group | 1.48 | 0.13 | Good |
| Example 3 | Ink B | carboxy group | 1.26 | 0.10 | Good |
| Example 4 | Ink C | sulfo group | 1.15 | 0.07 | Good |
| Example 5 | Ink D | phosphate group (Magenta) | 1.10 | 0.09 | Good |
| Example 6 | Ink A | phosphate group | 1.48 | 0.13 | Good |
| Example 7 | Ink B | carboxy group | 1.26 | 0.10 | Good |
| Example 8 | Ink A | phosphate group | 1.44 | 0.09 | Good |
| Example 9 | Ink A | phosphate group | 1.40 | 0.05 | Good |
| Example 10 | Ink A | phosphate group | 1.31 | 0.09 | Good |
| Example 11 | Ink B | carboxy group | 1.12 | 0.06 | Good |
| Comp. Ex. 1 | Ink A | phosphate group | 1.36 | 0.01 | NG |
| Comp. Ex. 2 | Ink A | phosphate group | 1.33 | −0.02 | NG |
| Comp. Ex. 3 | Ink A | phosphate group | 1.31 | 0.01 | NG |
| Comp. Ex. 4 | Ink A | phosphate group | 1.12 | 0.00 | NG |
| Cont. Ex. 1 | Ink A | phosphate group | 1.35 | — | — |
| Cont. Ex. 2 | Ink B | carboxy group | 1.16 | — | — |
| Cont. Ex. 3 | Ink C | sulfo group | 1.08 | — | — |
| Cont. Ex. 4 | Ink D | phosphate group (Magenta) | 1.01 | — | — |
| Cont. Ex. 5 | Ink A | phosphate group | 1.22 | — | — |
| Cont. Ex. 6 | Ink B | carboxy group | 1.06 | — | — |

The value, which was obtained by subtracting the OD value obtained in Control Example when the printing was performed by using the ink of the same type on the printing paper coated with the treatment solution composed of only the solvent of the same type, from the OD value obtained in each of Examples 1 to 11 and Comparative Examples 1 to 4, was designated as "ΔOD". That is, in the case of Examples 1, 2, 6, 8, and 9 and Comparative Examples 1 and 2 in which Ink A and Treatment solutions 1 to 5 containing water as the solvent were used, the value, which was obtained by subtracting the OD value of Control Example 1 based on the use of Ink A and Treatment solution 11 composed of only water from the obtained OD value, was designated as ΔOD. In the case of Example 10 and Comparative Examples 3 and 4 in which Ink A and Treatment solutions 6, 9, and 10 containing ethanol as the solvent were used, the value, which was obtained by subtracting the OD value of Control Example 5 based on the use of Ink A and Treatment solution 12 composed of only ethanol from the obtained OD value, was designated as ΔOD. The OD value was also dealt with in the same manner as described above in relation to other Examples and Comparative Examples based on the use of Inks B, C, and D.

The measurement error of the apparatus was about ±0.01. Therefore, when ΔOD exceeded 0.01, it was judged that the effect to improve the OD value was provided by the treatment solution.

3. Discussion

In the case of Comparative Examples 1 to 4 in which Treatment solutions 7 to 10 containing succinimide or phthalimide having no substituent at the N position were used, ΔOD was not more than 0.01, and the OD value was not improved by the treatment solution.

On the other hand, in the case of Examples 1 to 11 in which Treatment solutions 1 to 6 containing N-hydroxysuccinimide or N-hydroxyphthalimide as the N-hydroxy cyclic imide compound were used, ΔOD was not less than 0.05, and the OD value was improved by the treatment solution. Further, when the test was performed by using Treatment solutions 1 to 5 containing N-hydroxysuccinimide as the treatment solution and using Ink A containing the phosphate group modified self-dispersible pigment (Black) as the ink (Examples 1, 2, 6, 8, and 9), ΔOD was increased approximately linearly in proportion to the increase in the content of N-hydroxysuccinimide within a range in which the content of N-hydroxysuccinimide was 0.1 to 5% by mass. Further, a value of ΔOD=0.05 was obtained even in the case of Example 9 in which the content of N-hydroxysuccinimide was 0.1%, wherein it was confirmed that the sufficient effect to improve the image quality was provided.

When the content of N-hydroxysuccinimide is increased while exceeding 5% by mass, it is considered that the value of ΔOD is gradually increased, but the degree of increase gradually becomes gentle, and the saturation state is provided sooner or later.

When Ink B containing the carboxy group modified self-dispersible pigment (Black) was used (Examples 3, 7, and 11) and when Ink C containing the sulfo group modified self-dispersible pigment (Black) was used (Example 4), then it was also confirmed that the sufficient effect to improve the image quality was provided in the same manner as when Ink A containing the phosphate group modified self-dispersible pigment (Black) was used (for example, Examples 2, 6, and 10).

When Examples 2 to 4, in which Treatment solution 2 was identically used, are compared with each other, the effect to improve the image quality is the highest in Example 2 ($\Delta OD$ was 0.13) in which the phosphate group modified self-dispersible pigment was used as the self-dispersible pigment contained in the ink, followed by Example 3 ($\Delta OD$ was 0.10) in which the carboxy group modified self-dispersible pigment was used, followed by Example 4 ($\Delta OD$ was 0.07) in which the sulfo group modified self-dispersible pigment was used. It is noted that the condensation reaction with the hydroxy group is caused more easily when the carboxy group is used as compared with the sulfo group, and the condensation reaction is caused more easily when the phosphate group is used as compared with the carboxy group. According to this fact, it is possible to consider that the larger effect to improve the image quality is obtained by using the ink which contains the self-dispersible pigment having the modification group with which the condensation reaction with N-hydroxysuccinimide proceeds more easily.

Further, it was confirmed that the sufficient effect to improve the image quality was also provided in the same manner as the case in which Ink A containing the phosphate group modified self-dispersible pigment (Black) was used (for example, Example 2), when Ink D, which contained the phosphate group modified self-dispersible pigment (Magenta), was used (Example 5). It is considered that the effect to improve the image quality is also obtained in accordance with the same mechanism in the case of any ink containing the self-dispersible pigment of any other color.

Further, it was confirmed that the effect to improve the image quality, which was approximately equivalent to that obtained when the treatment solution containing N-hydroxysuccinimide was used (Example 2), was also provided when the test was performed by using Treatment solution 6 containing N-hydroxyphthalimide and Ink A containing the phosphate group modified self-dispersible pigment (Black) (Example 10). It was confirmed that the effect to improve the image quality was also provided in the same manner as described above when Treatment solution 6 and Ink B containing the carboxy group modified self-dispersible pigment (Black) were used (Example 11). It is estimated that the sufficient effect to improve the image quality is also provided in the same manner as the case in which Ink A is used, when Ink C containing the sulfo group modified self-dispersible pigment (Black) is used. Further, it is considered that the effect to improve the image quality is also obtained in accordance with the same mechanism in the case of any ink containing the self-dispersible pigment of any other color and any ink containing the self-dispersible pigment modified with the functional group composed of the salt of, for example, the phosphate group, the carboxy group, and the sulfa group.

As described above, according to the results of Examples 1 to 11, it has been confirmed that the sufficient effect is exhibited by the treatment solution containing N-hydroxysuccinimide or N-hydroxyphthalimide in relation to the combination with the pigment ink containing the major self-dispersible pigment used at present.

Even in the case of the use of Treatment solution 3 added with the water-soluble organic solvent (Examples 6 and 7), the equivalent effect to improve the image quality is obtained as compared with the case in which the water-soluble organic solvent is not added (Examples 2 and 3 based on the use of Treatment solution 2). Therefore, it is possible to consider that any special harmful influence is not exerted on the achievement of the object of the present teaching, even when the treatment solution is mixed with the water-soluble organic solvent, for example, in order to secure the wettability and/or suppress the evaporation, if necessary.

Although the data is not shown in detail, the value of $\Delta OD$ was not greatly changed even when an experiment was performed while changing the content of the water-soluble organic solvent in the ink within a practical range. Therefore, it is affirmed that the object of the present teaching can be achieved even when the content of the water-soluble organic solvent is changed in the ink within the practical range.

What is claimed is:

1. A treatment solution for ink-jet recording, comprising:
a solvent comprising water, a water-soluble organic solvent, or both; and an N-hydroxy cyclic imide compound which is soluble in the solvent and contained in an amount not less than 0.1% by mass and not more than 5.0% by mass.

2. The treatment solution for ink-jet recording according to claim 1, wherein the N-hydroxy cyclic imide compound is N-hydroxysuccinimide or N-hydroxyphthalimide.

3. An ink set comprising:
a treatment solution for ink-jet recording comprising a solvent comprising water, a water-soluble organic solvent, or both; and
an N-hydroxy cyclic imide compound which is soluble in the solvent and contained in an amount not less than 0.1% by mass and not more than 5.0% by mass; and
an ink which contains water, a water-soluble organic solvent, and a self-dispersible pigment.

4. The ink set according to claim 3, wherein the self-dispersible pigment is modified by at least one functional group selected from the group consisting of phosphate group, carboxyl group, and salt thereof.

5. An ink-jet recording method for performing recording on a recording medium, comprising:
applying the treatment solution of the ink set as defined in claim 3 to the recording medium; and
discharging the ink of the ink set to the recording medium.

6. The ink-jet recording method according to claim 5, wherein the ink is discharged to the recording medium after the applying of the treatment solution to the recording medium.

7. The ink-jet recording method according to claim 5, wherein the treatment solution is applied by discharging the treatment solution to the recording medium or coating the recording medium with the treatment solution.

8. An ink-jet recording apparatus for performing recording on a recording medium, comprising:
an ink set accommodating unit which accommodates the ink set as defined in claim 3;
a treatment solution applying mechanism which applies, to the recording medium, the treatment solution of the ink set accommodated in the ink set accommodating unit; and
an ink discharge mechanism which discharges the ink of the ink set to the recording medium.

9. The ink jet recording apparatus according to claim 8, wherein the treatment solution applying mechanism is a treatment solution discharge mechanism or a treatment solution coating mechanism.

* * * * *